United States Patent
Wankmueller

(10) Patent No.: US 9,911,121 B2
(45) Date of Patent: Mar. 6, 2018

(54) METHOD AND SYSTEM FOR AUTHORIZING A TRANSACTION USING A DYNAMIC AUTHORIZATION CODE

(75) Inventor: John Wankmueller, Great Neck, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 540 days.

(21) Appl. No.: 11/675,723

(22) Filed: Feb. 16, 2007

(65) Prior Publication Data

US 2008/0040285 A1 Feb. 14, 2008

Related U.S. Application Data

(63) Continuation of application No. PCT/US2005/029758, filed on Aug. 18, 2005.

(60) Provisional application No. 60/602,594, filed on Aug. 18, 2004.

(51) Int. Cl.
*G06Q 20/38* (2012.01)
*G06Q 20/32* (2012.01)
*G06Q 20/36* (2012.01)
*G06Q 20/40* (2012.01)

(52) U.S. Cl.
CPC ........ *G06Q 20/385* (2013.01); *G06Q 20/32* (2013.01); *G06Q 20/3674* (2013.01); *G06Q 20/40* (2013.01)

(58) Field of Classification Search
USPC ....................................................... 713/168
See application file for complete search history.

(56) References Cited

U.S. PATENT DOCUMENTS

| | | | | |
|---|---|---|---|---|
| 5,280,527 | A * | 1/1994 | Gullman | G06K 19/0718 713/184 |
| 5,940,510 | A * | 8/1999 | Curry | G06Q 20/10 705/65 |
| 6,098,056 | A * | 8/2000 | Rusnak | G06Q 20/3821 705/75 |
| 7,043,635 | B1 * | 5/2006 | Keech | G06Q 20/341 380/249 |
| 2001/0056409 | A1 | 12/2001 | Bellovin et al. | |
| 2002/0095604 | A1 * | 7/2002 | Hausler | H04L 9/0861 380/255 |

(Continued)

FOREIGN PATENT DOCUMENTS

| | | |
|---|---|---|
| EP | 1028401 A2 | 8/2000 |
| FR | 2816736 | 5/2002 |

(Continued)

OTHER PUBLICATIONS

Extended European Search Report for EP 05791626, dated Mar. 26, 2012.

(Continued)

*Primary Examiner* — Tsan-Yu J Huang
(74) *Attorney, Agent, or Firm* — Baker Botts L.L.P.

(57) ABSTRACT

A method and apparatus for conducting a secure transaction involving generation of a dynamic authentication code on a mobile device, based on secret data which does not identify an account. The authentication code and financial account identifying information are transmitted to a validating entity, which shares information about the secret data, to authorize the transaction.

16 Claims, 3 Drawing Sheets

(56) References Cited

U.S. PATENT DOCUMENTS

| | | | |
|---|---|---|---|
| 2002/0129250 A1 | 9/2002 | Kimura | |
| 2002/0147600 A1* | 10/2002 | Waters | G06Q 20/04 |
| | | | 705/39 |
| 2003/0105964 A1 | 6/2003 | Brainard et al. | |
| 2003/0167207 A1 | 9/2003 | Berardi et al. | |
| 2004/0172535 A1 | 9/2004 | Jakobsson et al. | |
| 2004/0267664 A1* | 12/2004 | Nam | G06Q 20/04 |
| | | | 705/41 |
| 2008/0040285 A1* | 2/2008 | Wankmueller | G06Q 20/32 |
| | | | 705/67 |

FOREIGN PATENT DOCUMENTS

| | | |
|---|---|---|
| JP | 2002261755 | 9/2002 |
| WO | WO 98/47116 A1 | 10/1998 |
| WO | WO 1998/054943 | 12/1998 |
| WO | WO 99/23617 A2 | 5/1999 |
| WO | WO 01/17310 A1 | 3/2001 |
| WO | WO 2002/039392 | 5/2002 |
| WO | WO2002084548 | 10/2002 |

OTHER PUBLICATIONS

Summons to Attend Oral Proceedings and Provisional Opinion of the EPO Examining Division dated Aug. 13, 2015 in EP Application No. 05791626.4.
Office Action dated Apr. 25, 2015 in United Arab Emirates Patent Application No. UAE/P/136/2007.

* cited by examiner

METHOD AND SYSTEM FOR AUTHORIZING A TRANSACTION USING A DYNAMIC AUTHORIZATION CODE

CROSS-REFERENCE TO RELATED APPLICATIONS

This application is a continuation of International Application PCT/US05/029758 filed Aug. 18, 2005 which claims priority from U.S. provisional application No. 60/602,594 filed Aug. 18, 2004 each of which is incorporated by reference in its entirety herein, and from which priority is claimed.

BACKGROUND OF INVENTION

The use of credit and debit cards for remote transactions is ever increasing. Whether over the telephone, through the mail, at retail outlets, or over the Internet, the need to perform transactions without face-to-face contact is a common one. A remote transaction, however, is less secure than a face-to-face transaction and the likelihood of fraud is commensurately higher, particularly if a transaction card is lost or stolen.

One approach to minimizing fraud is through the use of a personal identification number, or PIN. In this approach, at the time of the transaction, the user's card is inserted or swiped in a card reader. The reader extracts certain data from the card, such as an account number. The card reader then requests the user enter his or her PIN on a keypad. The PIN is encrypted or otherwise secured and the secure PIN data is transmitted to an authorization location, such as an authorization computer, where cardholder data is stored. At the authorization computer, the account identification data is used to lookup and retrieve account information, and the retrieved information is used to verify that the PIN entered by the cardholder was correct. This approach minimizes fraud because the person in possession of the card must also know the secret PIN to complete the transaction. One disadvantage to this approach is that, because the PIN is static, a thief could intercept the PIN during a legitimate transaction and reuse it in a subsequent fraudulent transaction.

In another approach recently suggested by the inventor, the use of a static PIN is replaced by a dynamic code that frequently changes. That approach is described in more detail in U.S. Patent Application No. 60/626,649 entitled "Method And System For Enabling The Use Of Dynamic Codes For Authentication," which application is hereby incorporated by reference in its entirety. One aspect of this approach involves generating a dynamic code using a smart card and smart card reader. Smart cards are well known in the art and are typically credit card shaped cards that include a secure data storage area and processor. At the time of a potential transaction, the smart card generates an application cryptogram using secret data stored in the secure memory of the smart card, as well as other data related to the potential transaction. The generation of application cryptograms is well known in the art and are explained in more detail, for example, in the well known smart card specifications entitled: "EMV Integrated Circuit Card Specifications for Payment Systems" promulgated by EMVCo. LLC. available on the Internet at http://www.emvco.com, which specifications are hereby incorporated by reference in their entirety. This data, or a portion of it, is then transmitted as a dynamic code to an authorization computer. The authorization computer can verify, based on account information retrieved from an authorization database associated with the account number, whether the dynamic code was generated by the smart card associated with the account number being used to complete the transaction, or not.

One disadvantage to using smart cards to enhance the security of a transaction is that they are relatively expensive to manufacture compared to a more traditional magnetic stripe card. Additionally, smart cards require a smart card reader to be used during each transaction, requiring an upgrade from existing point of sale terminals that are designed for magnetic stripe cards. Because of these and other reasons, smart cards and smart card readers have not been deployed widely in the United States.

SUMMARY OF THE INVENTION

The present invention permits transactions to be authorized in a more secure manner without the necessity for widely distributing smart cards and smart card readers. Instead, the processing capacity of a mobile consumer device, such as a PDA or cell phone, which a cardholder already possess, is employed to generate a dynamic authorization code associated with a particular cardholder account. The mobile device will not contain data that could identify the particular account with which it is associated. The dynamic code, together with account identification data, are then transmitted to an authentication computer to verify the authenticity of a transaction.

In one exemplary embodiment of the present invention, a method is provided for authorizing a transaction. The method entails associating account secret data with a unique financial account identifier in an authorization database and generating personalization data based at least in part on data associated with the account secret data. The personalization data is transmitted to a mobile processing device, such as a PDA or cellphone, that does not contain the unique financial account identifier, for storage therein. Subsequently, an authorization request is received at an authorization location. The request includes the financial account identifier and a dynamic authentication code generated by the mobile processing device. A determination is then made as to whether the authentication code was generated by a mobile processing device containing personalization data that was generated at least in part based on data associated with the account secret data associated with the financial account identifier in the authorization database. Finally, the transaction may be authorized or not authorized depending on the previous determination.

BRIEF DESCRIPTION OF THE DRAWINGS

For a more complete understanding of the present invention, reference is made to the following detailed description of exemplary embodiments with reference to the accompanying drawings in which.

DETAILED DESCRIPTION OF THE EXEMPLARY EMBODIMENTS

Figure 1:
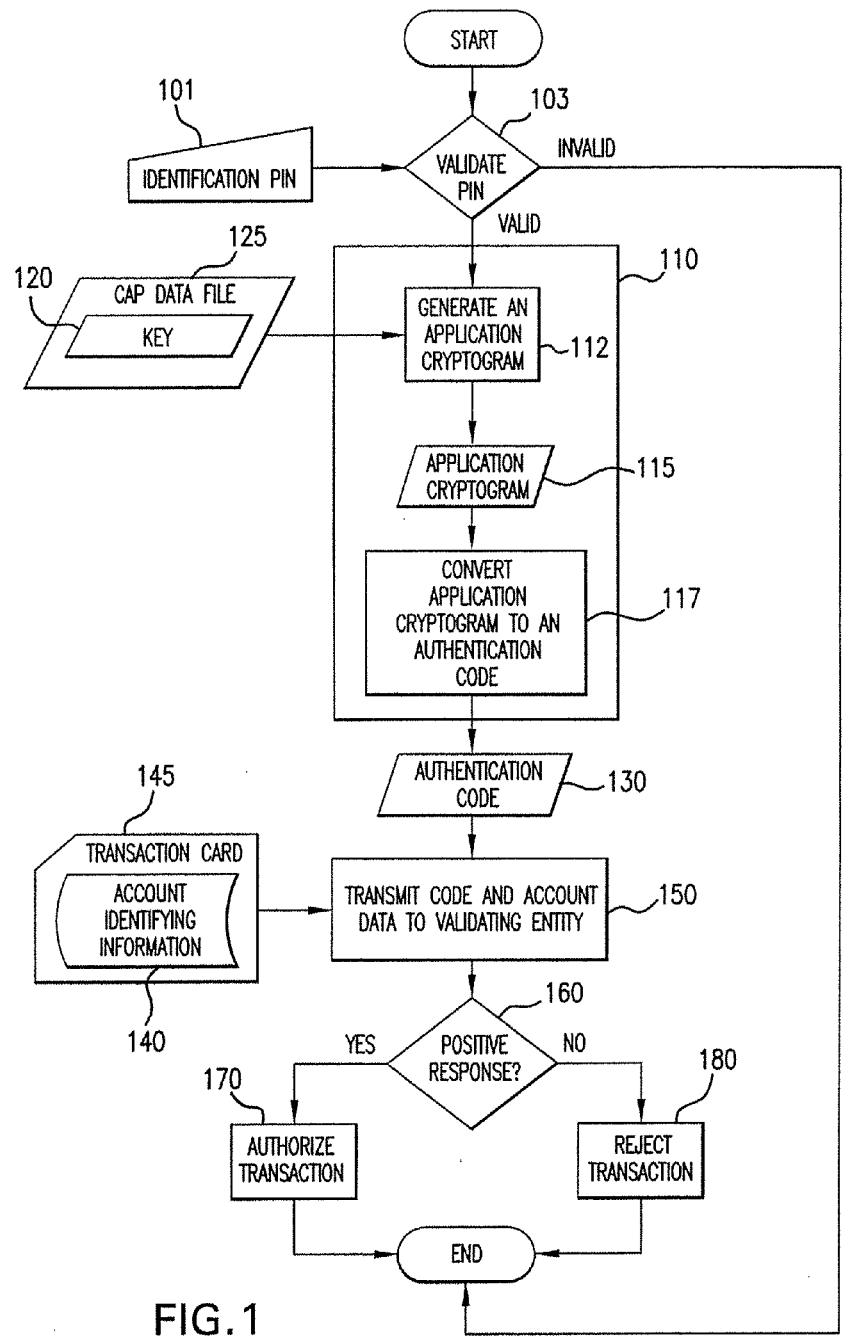
FIG. 1 is a flow chart of the steps of performing a transaction using a generated authentication code and account identifying information in accordance with one exemplary embodiment.

FIG. 1 is a flow chart depiction of one exemplary embodiment of the present invention that entails performing a transaction using a generated dynamic authentication code 130 and account identifying information or a unique financial account identifier 140. The following description will be based on a hypothetical transaction performed over a computer network, such as the Internet. However, it will be understood that the principles of the invention are not limited to transactions over a computer network, but could be easily adapted to other types of transactions, such as transactions over a telephone, through mail, face-to-face, or in any other manner.

The hypothetical transaction begins with a user of a personal computer (PC) making a request to purchase a good or service from a merchant using a web browser or similar application running on the personal computer. It should be noted that any device, system or scheme for requesting or performing a transaction can be used in place of the PC, including a mobile device such as a PDA or cellular telephone. The user's request then causes the merchant's computer to invoke an authorization request server to authenticate the user's identity and verify the transaction is legitimate. The authorization request server or authorization processor, which can be a mainframe or other computer with a processor, memory, and communications link, prompts the user to provide a dynamic authorization code using his or her mobile processing device.

In step 101, the user activates his or her mobile processing device, such as a personal digital assistant (PDA) or cellular telephone, and invokes functionality to generate a dynamic authentication code. The mobile processing device, which is discussed in further detail herein, includes software or circuitry for generating the dynamic codes. In a particular exemplary embodiment, the software or circuitry on the mobile device has substantially all of the functionality of a typical smart card, although without any data that can be directly used to uniquely identify a financial or payment account. In one embodiment, once the mobile device is activated, the user is prompted to enter an identification PIN using a keypad, keyboard, or some other technique for receiving user input into the mobile processing device. It should be understood that the mobile processing device could be a laptop or other personal computer and could be the same personal computer as is being used to perform the hypothetical transaction being discussed. Typically however, the personal computer on which the transaction is being performed and the mobile device will be separate devices. The mobile device then validates in step 103, whether the PIN is valid by comparing the PIN with data stored on the device. Notably, steps 101 and 103 are not required, but may be advantageously used to improve security of the authorization system and deter fraud. Additionally, where a PIN is used, the PIN input process can be delayed until after other data relating to the transaction is entered by the user into the mobile device, as discussed herein in more detail.

In one exemplary embodiment, the authorization processor may also provide to the user a challenge number, or other unpredictable data that the user will enter into his or her mobile processing device, which will subsequently be used to generate the dynamic authentication code, typically in conjunction with other data such as an encryption key. The unpredictable data may be a random number, can be based on the current time, a one-way hash of the proposed transaction amount, some combination thereof, or any other data that can not be easily predicted before a transaction. The user may also be prompted to enter other data regarding the transaction into the mobile device, such as the transaction amount or currency type, and this data may be used by the device, together with other secret data, to generate a cryptogram that will become a dynamic authorization code as discussed in more detail herein.

In step 110 the mobile processing device generates a dynamic authentication code 130 using a key 120, such as an encryption key. The key 120 may be a DES key, a private key, a public key, some combination thereof, or any other data used for encryption or generating a secure message for subsequent authentication. The key may be stored, for example in application memory in the mobile processing device. If the mobile processing device includes secure or protected memory, (e.g. in a subscriber identity module (SIM) card inserted into a cellular phone or PDA), the key could advantageously be stored there instead. The key 120 may also be encrypted or held in a memory unit that is inaccessible to other processes, programs or applications running on the mobile device. For example, the key could be encrypted by a second key, such as a user PIN, mobile device serial number, other data or a combination thereof. Notably, the presence of secure memory in the mobile device is not required.

The memory of the mobile device should contain no information that would identify the account with which the key 120 corresponds. Specifically, the key 120, and the mobile device memory, should not contain the payment account number (PAN), card expiry date, card track data typically stored on a transaction card magnetic stripe, the account holder name, nor any other data that could uniquely identify the financial account. In this way, if the mobile device is stolen or compromised, the device could not be used to perform a transaction as there would be no data identifying the financial account to which the key 120 corresponds.

In one exemplary embodiment, key 120 is held within a chip authentication program (CAP) data file 125, together with an application profile identifier, an application transaction counter, and other data. More details regarding chip authentication program formats and functionality can be found in MasterCard's Chip Authentication Program specifications, which are available for license from MasterCard International Incorporated in Purchase, New York and are hereby incorporated by reference in their entirety. The CAP data file 125 may in one exemplary embodiment be encrypted, and subsequently decrypted using the PIN input by the user, a Mobile Device Identifier, such as a phone number or device serial number, gathered from the device on which the decryption occurs, or a combination of both. In this way, use of the CAP data file can be restricted to individuals who know the PIN, devices that have been approved, or a combination of both. The transaction counter, which is optionally included in the data file 125, is in one exemplary embodiment a sequential counter that is incremented every time a dynamic authorization code is generated.

The generation of the authentication code of step 110 may be further understood as including the generation of an application cryptogram 115 in step 112. The application cryptogram is generated from the key 120, and other data such as the transaction counter, using techniques well known in the art of smart card design or operation, for example in the manner EMV-compliant smart cards operate when provided with the GENERATE AC command. In the previously described exemplary embodiment where the authorization processor provides unpredictable data to the user, the application cryptogram is generated based on the unpredictable data in addition to the key 120 and transaction counter. Other data regarding the transaction can also be used in calculating the application cryptogram, such as the transaction amount, transaction date/time, currency type, etc. For example, in one embodiment, the unpredictable data, transaction counter, and any other relevant data could be concatenated together and encrypted using the key 120 to generate an application cryptogram. The authentication processor and/or issuer bank can select which data should be used in calculating the application cryptogram for transaction accounts maintained by the issuer bank. Accordingly, in this exemplary embodiment, the mobile device essentially becomes a "software smart card" functioning in a similar manner to that described by the CAP specifications for smart cards.

In one exemplary embodiment, the application cryptogram 115 is an intermediate data format that may consist of the following data items expressed in binary form and concatenated from most to least significant as follows: cryptogram information data (8 bits), transaction counter (16 bits), cryptogram computed by the mobile processing device (64 bits), and issuer application data (0-256 bits). The issuer application data is data selected by the financial institution that maintains the cardholder's account and can be any data; however, for purposes of this invention, it is preferable that the issuer application data not include information that could be used to identify the cardholder or the financial account associated with the cardholder.

Because the output of this intermediate step could potentially result in a data value up to 43 bytes long (i.e. a value ranging from 0 up to $2^{344}$ or approximately $3.6 \times 10^{103}$), which would be far too large to present to a user as a decimal number, this data must be compressed or otherwise restricted before it is displayed to a user. Indeed, even the 64 bit cryptogram, which forms a part of the intermediate data, would be too long to display to a user in decimal numeric format, taking into consideration the possibility that the user may need to re-enter the dynamic code into their web browser on the computer on which the transaction is being performed. Accordingly, in step 117, the intermediate data is reduced to a more manageable data size and presented to the user. In one exemplary embodiment, the intermediate cryptographic data is reduced to 8 numeric characters, resulting in possible values from 0 up to 99,999,999. This reduction is accomplished in one exemplary embodiment through use of a bitmap that identifies which of the bits in the intermediate data form should be retained and used to compute the dynamic authentication code. For example, the bitmap could identify bits 1-15, 17-19, and 21-27 as the bits to retain from the intermediate calculation. The retained bits are then concatenated together and displayed in binary coded decimal format (BCD). Using this approach, in order to ensure that the possible values displayed to the user does not exceed 8 digits, the maximum number of bits that can be retained is 26. The precise bits that are retained are subject to design choice depending on the particular application and circumstances; however, the algorithm used to select the bits to be retained must be known to the authorization processor as well so that the authorization processor can verify the dynamic authentication code generated by the mobile processing device.

In one exemplary embodiment, the bits and data known to the authorization processor, or data that the authorization processor can derive from other data known to it or provided in the dynamic authentication code is not included in the final dynamic authentication code that is generated. For example, if a transaction counter is used and the authentication processor maintains a copy of the transaction counter associated with the mobile device in an authorization database, the complete transaction counter need not be included in the data used to generate the dynamic mode. For instance, it may only be necessary to include some of the least significant bits of that counter. In that way, even if the copy of the transaction counter stored in the authorization database gets out of synchronization with the counter on the mobile device, the authorization processor will be able to rebuild the transaction counter and accurately compute its own version of the cryptogram using the partial data received regarding the counter from the mobile device in the dynamic authorization code.

Other bits of the intermediate data, including the calculated cryptogram, may also be excluded as long as a reasonable number of the bits are maintained to minimize the probability of an erroneous authentication, keeping in mind that the authorization processor will calculate its own version of the cryptogram using the secret it shares with the mobile device (i.e. the secret key in the exemplary embodiment) as well as the transaction specific data, such as the unpredictable number, transaction counter, etc. and will authorize the transaction if the processor determines that the cryptogram calculated by the mobile device, as evidenced by the dynamic authorization code received from the mobile device, matches the cryptogram calculated by the authorization processor, after masking with the aforementioned bitmap.

The manner in which the cryptogram is computed can vary and are too numerous to recite here. In one embodiment, the cryptogram entails performing a calculation based on data selected by the accountholder's issuer bank and encrypting the result of that calculation with the secret information stored on the card, such as an encryption key. The cryptogram generation step 110 however should produce a dynamic, not static, authentication code 130 that varies unpredictably even with repeated transactions of the same type and amount. This will reduce the possibility that an eavesdropper could intercept and replay the dynamic authorization code in a subsequent attempted transaction that is not actually authorized by the cardholder associated with the financial account being used to perform the transaction. Additionally, the calculation should demonstrate that the cardholder associated with the financial account being used to perform the transaction has authorized the transaction. In one preferred embodiment, this is accomplished by requiring the input of a PIN to the device before the dynamic authentication code is generated.

Although the authentication code is dynamic and frequently changes based on various factors, such as particular transaction characteristics and other random and varying data, the generation step 110 may entail the creation of a particular authentication code more than once over time, without departing from the scope of the claimed invention. The generation step 110 may be performed on any mobile processing device, such as a PDA, mobile or cellular telephone, laptop computer, or other device. The device should have a processor capable of performing the steps necessary to generate the authentication code 130. The mobile processing device may also be a smart card and the generation step 110 may be performed by the smart card.

Figure 2:
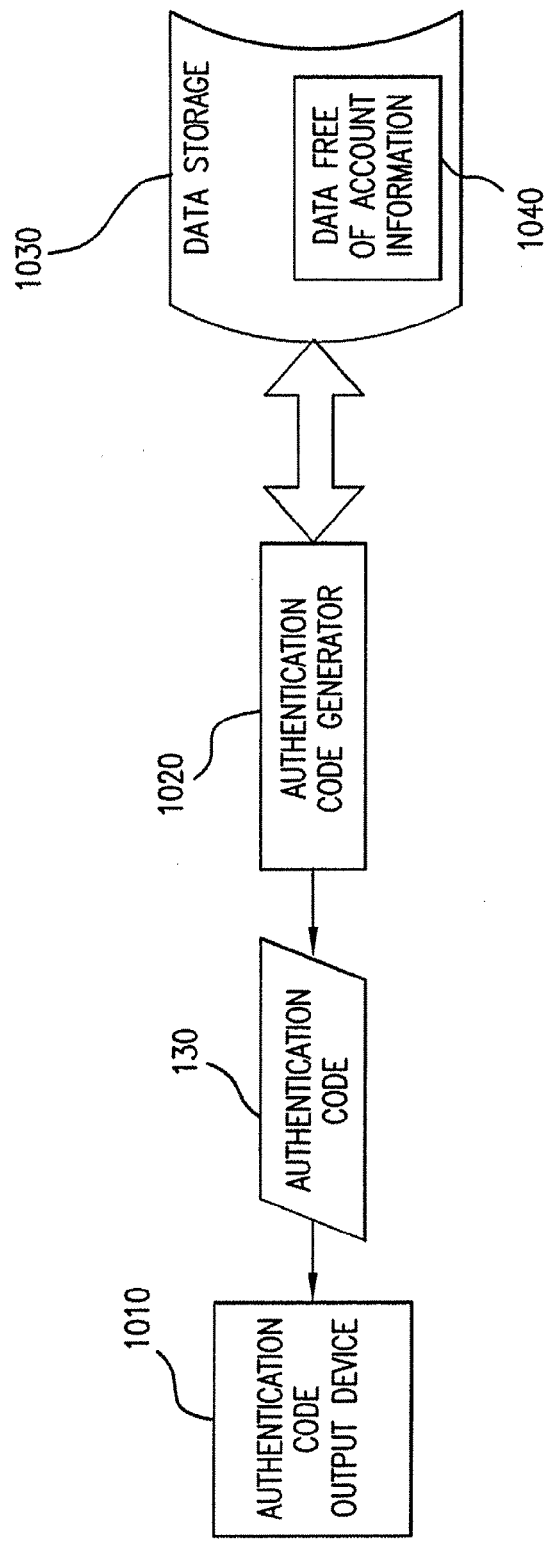
FIG. 2 is a block diagram of one exemplary system for generating an authentication code.

As shown in FIG. 2, the mobile device in one exemplary embodiment includes data storage area 1030, such as RAM, flash, hard drive, or other memory, that contains data used to generate a dynamic authentication code, including data entered by user of the device. The device also includes an authentication code generator 1020, which may be a processor programmed to generate an authentication code in accordance with any of the techniques described herein and well-known to persons of skill in the art. The generator 1020 generates a dynamic authentication code 130, previously described, and provides the code to an output device 1010. This authentication code output device 1010 could present the resulting dynamic authentication code 130 to a user, such as through a LCD screen or other display, through synthesized speech techniques or audio sounds, or some other means. Alternatively, or in addition, the device 1010 could transmit the authentication code 130 via wires, infrared, or radio frequency signals to another device, such as a personal computer or terminal on which a transaction is being performed, for subsequent transmission to an authorization location. In another exemplary embodiment, the mobile device can communicate the dynamic authentication code directly to an authorization processor at an authorization location over a communication network, such as a wireless communications network, the Internet, or a combination thereof.

Additionally, to assist in identifying the account for which the authentication code 130 is generated (for example where the device is capable of generating codes for a plurality of different accounts associated with the user or users of the device), the authentication code output device 1010 could display or transmit a promotional name, a graphical logo, or an identifying token to a user to assist the user in interacting with the device to select the proper account for which a dynamic code is to be generated.

Returning now to FIG. 1, the account secret data, such as the encryption key, is stored in an authorization database accessible by the authorization processor (not shown). The secret data corresponds to a particular financial account (for example a credit or debit account) associated with the user of the mobile processing device. The authorization database is preferably accessible only by the authorization processor and/or the bank or financial institution that maintains the user's account, typically referred to as the "issuer" bank by persons of skill in the art. If a mobile device is stolen or compromised, a person possessing the device would not be able to perform a transaction, because the authorization code 130 generated by the device cannot be used to authenticate a transaction without some other financial account identifier, such as a primary account number (PAN) that identifies the particular financial account to which the goods or services should be billed.

Accordingly, at the time of a transaction, the financial account identifier 140 should be collected using various techniques well known to persons skilled in the art. For example, the account identifier 140 may be stored on a magnetic stripe card 145 or on a smart card, or collected through user input to a device such as a keypad, keyboard, or other input device.

In step 150 the dynamic authentication code 130, along with financial account identifier data 140, is transmitted to an authorization location, such as an authorization processor. Depending on the response from the authorization location, in step 160, the transaction may be authorized in step 170 or declined in step 180.

As described previously, the authorization process may entail calculating, at the authorization location, the dynamic authentication code using the same data and algorithm as performed by the mobile device, and comparing the calculated result to the received dynamic code to confirm that the calculated results matches the received code. This process utilizes the secret data, such as the encryption key, associated with the financial account identifier provided with the transaction. In once embodiment, the dynamic code received at the authorization location is analyzed to determine if the code includes any data used by the mobile device to calculate the application cryptogram that is not known by the authorization processor. For example, it is possible that the mobile device used a transaction counter to calculate the application cryptogram, in which case it is necessary to provide the counter to the authorization processor as well so that it can use the same data in calculating its version of the application cryptogram. As previously mentioned, although a copy of the transaction counter associated with a particular account or mobile device may be stored in an authorization database, or at the authorization location, the stored copy of the counter may not be synchronized with the counter on the mobile device due to previous failed transactions that were not communicated to the authorization processor or authorization database. Accordingly, once the authorization processor extracts or recreates any necessary data from the data provided in the dynamic authentication code, the authorization processor can calculate the dynamic authorization code using the techniques previously described, including performing a calculation with the relevant transaction data and secret account information, such as the encryption key associated with the account. This calculated code is then compared with the dynamic code received from the mobile device, as previously described.

One exemplary technique to deploy the necessary programming and data to mobile processing devices entails a deployment server. In this embodiment, the user of the mobile device visits a website specified by the user's issuer bank and the user requests the dynamic authorization code generator application be installed on the user's mobile device. The user is prompted for a PIN to be associated with the application and the user's Mobile Device Identifier. The user may also be prompted for his or her financial account identifier, or this data may be determined through some other approach. Account secret data, such as an encryption key or key pair, is generated and associated with the user's financial account identifier. At least a portion of this secret data (for example the encryption key or one or more of the keys in a key pair) is then stored in an authorization database record associated with the user's financial account identifier.

Personalization data is then generated based on data associated with the secret data previously generated. For example, the encryption key or one or more of the keys in a key pair may be encrypted, such as with triple-DES, using the PIN and a Mobile Device Identifier, previously entered by the user, as the temporary key to create the personalization data. The personalization data and any additional executable program files are then communicated from the deployment server to the mobile device. The communication can occur via a direct connection between the user's mobile device and another computer, such as a PC, or can occur using an Over The Air (OTA) server using a mobile or wireless data network. The application and personalization data are then placed into memory of the mobile device, where they can be used to generate dynamic authentication codes as previously described herein. The account secret data and any encrypted or personalization data are removed from the deployment server either after a predetermined amount of time or after the application and personalization data has been successfully installed. At least a portion of the secret data remains stored in the authorization database however, for use during subsequent authorization requests.

In one embodiment, the application is provided in the form of a Java applet executed by a Java Virtual Machine installed on the mobile processing device. The Java applet instructions may in one exemplary embodiment be obfuscated for further security, for example by using DashO from Preemptive Solutions of Cleveland, Ohio.

Figure 3:
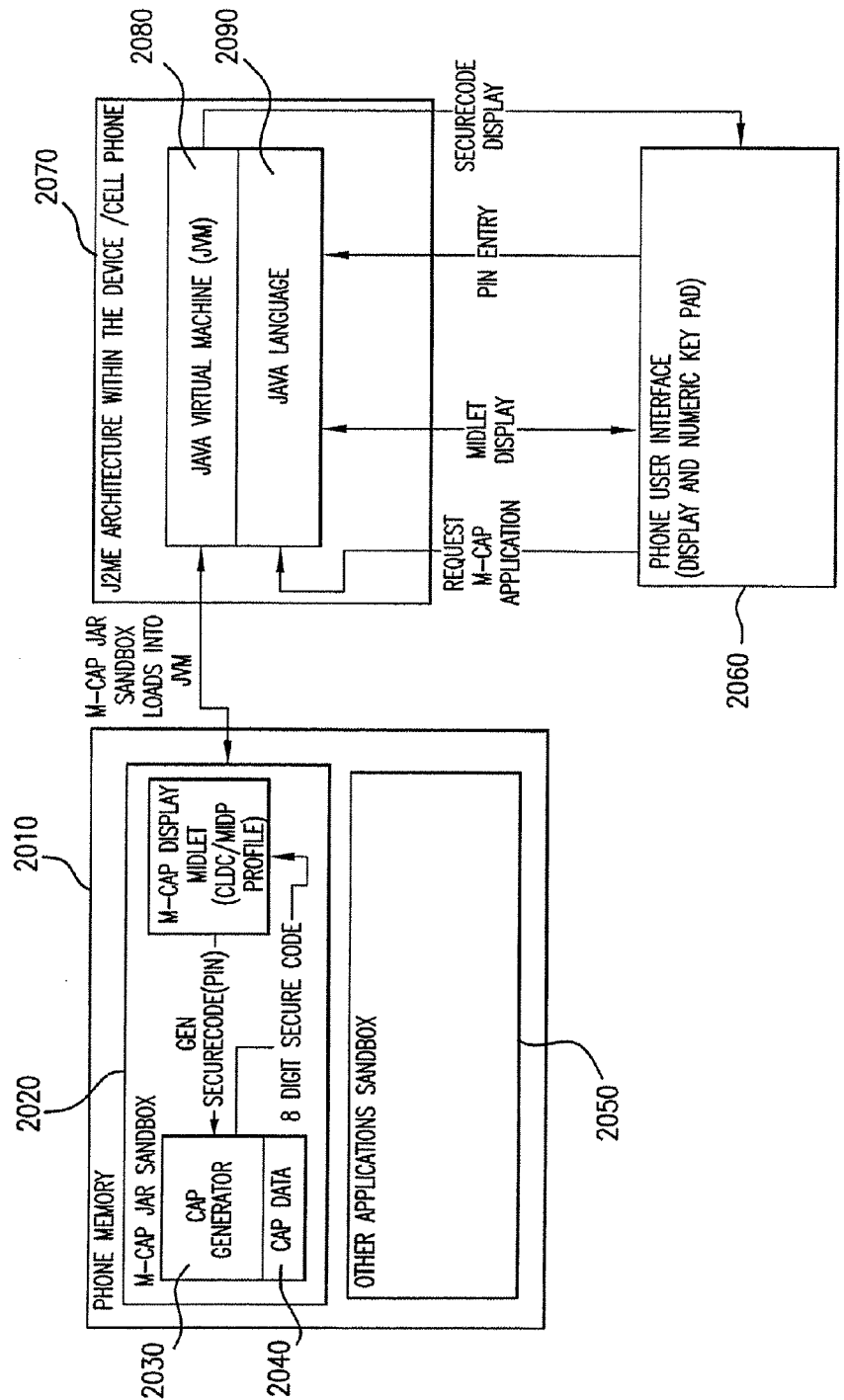
FIG. 3 is a block diagram of one exemplary embodiment of the present invention.

FIG. 3 shows a block diagram of an exemplary embodiment of the invention using the Java language 2090 and Java Virtual Machine (JVM) 2080. First, the mobile device user requests the dynamic authentication application be invoked using interface 2060, such as a keypad or keyboard. The JVM 2080 then loads the M-CAP.jar Sandbox 2020. The JVM 2080 prompts the user to enter a PIN, which is then received from the interface 2060. The CAP generator 2030 portion of the Java application then uses the CAP data 2040 to generate an eight-digit dynamic authentication code in accordance with the techniques previously described. The eight-digit code is returned, through the JVM 2080, to the phone user interface 2060. The CAP Data 2040 or the M-Cap Jar Sandbox 2020, residing in the phone memory 2010, may be encrypted, for example by using the Bouncy Castle Crypto API for J2ME from <http://www.bouncycastle.org/>.

Although the present invention has been described with reference to certain preferred embodiments, various modifications, alterations, and substitutions will be known or obvious to those skilled in the art without departing from the spirit and scope of the invention. Numerous other applications of the present invention will be apparent to one of ordinary skill in the art.

I claim:

1. A method for authorizing a transaction, comprising:
    associating, by at least one computer of an issuer bank, account secret data with a unique financial account identifier associated with a financial account in an authorization database;
    generating, by at least one computer of said issuer bank, personalization data based at least in part on data associated with said account secret data;
    transmitting, by at least one computer of said issuer bank, said personalization data to a mobile processing device associated with a holder of said financial account;
    wherein said mobile processing device contains a processor configured to generate a dynamic authorization code using at least in part said personalization data and a user challenge number input into said mobile processing device by said holder, and wherein said mobile processing device further configured to store transaction information other than a financial account number associated with said financial account, a card expiry associated with said financial account, card track data, or other financial account identifier;
    receiving, by at least one computer of said issuer bank, at an authorization location, an authorization request to authorize a transaction, said request including (1) said unique financial account identifier provided from said holder of said financial account not provided from said mobile processing device and (2) a dynamic authentication code generated by said mobile processing device, wherein generating said dynamic authentication code comprises generating an intermediate cryptogram and compressing said intermediate cryptogram, said cryptogram comprising an encryption based on said account secret data of at least said personalization data and said user challenge number concatenated and expressed in binary form;
    determining, by at least one computer of said issuer bank, whether said dynamic authentication code was generated by a mobile processing device containing personalization data that was generated at least in part based on data associated with said account secret data associated with said unique financial account identifier in said authorization database; and
    authorizing, by at least one computer of said issuer bank, said transaction in response to said determining step;
    wherein the determining step further comprises generating, by at least one computer, at the authorization location, a second dynamic authentication code using at least in part said personalization data, and comparing the dynamic authentication code generated by the mobile processing device and the second dynamic authentication code.

2. The method as in claim 1, wherein said processor of said mobile processing device is further configured to:
    prompt for input of an identification PIN; and
    validate said identification PIN before said dynamic authentication code is generated.

3. The method of claim 1, wherein said account secret data is an encryption key.

4. The method of claim 3, wherein said data associated with said account secret data is said encryption key.

5. The method of claim 3, wherein said encryption key is a private key and wherein said data associated with said account secret data is a public key associated with said private key.

6. The method of claim 1 wherein said processor of said mobile processing device is further configured to generate said dynamic authentication code based at least in part on a transaction counter stored on said mobile processing device.

7. The method of claim 6 wherein a copy of said transaction counter is maintained in said authorization database, further comprising the step of verifying said transaction counter used to generate said dynamic authentication code matches said copy of said transaction counter.

8. The method of claim 6 wherein said transaction counter is incremented when said dynamic authentication code is generated.

9. A system for authorizing a transaction, comprising:
    a storage medium of an issuer bank containing an authorization database containing at least one unique financial account identifier associated with a financial account and secret account data associated with said identifier;
    a mobile processing device associated with a holder of said financial account having a memory component and a processor;
    a transmitter of said issuer bank for transmitting personalization data to said mobile processing device, said personalization data based at least in part on data associated with said secret account data, but not including said financial account identifier;
    wherein said processor of said mobile processing device is configured to generate a dynamic authentication code using, at least in part, said personalization data and a user challenge number input into said mobile processing device by said holder, and wherein said memory component is configured to store transaction information other than a financial account number associated with said financial account, a card expiry associated with said financial account, card track data, or other financial account identifier;
    wherein said processor configured to generate said dynamic authentication code comprises generating an intermediate cryptogram and compressing said intermediate cryptogram, said cryptogram comprising an encryption based on said account secret data of at least said personalization data and said user challenge number concatenated and expressed in binary form;
    a receiver of said issuer bank for receiving an authorization request to authorize a transaction, said authorization request including: (1) said unique financial account identifier provided from said holder of said financial account and not provided from said mobile processing device and (2) said dynamic authentication code provided from said mobile processing device; and an authorization processor of said issuer bank for generating a second dynamic authentication code using at least in part said personalization data, determining whether said dynamic authentication code was generated by a mobile processing device containing personalization data that was generated at least in part based on data associated with said account secret data associated with said financial account identifier in said authorization database based at least in part on comparing the dynamic authentication code generated by the mobile processing device and the second dynamic authentication code, and for authorizing said transaction in response to said determining.

10. The system of claim 9, wherein said account secret data is an encryption key.

11. The system of claim 10, wherein said data associated with said account secret data is said encryption key.

12. The system of claim 10, wherein said encryption key is a private key and wherein said data associated with said account secret data is a public key associated with said private key.

13. The system of claim 9 wherein said mobile processing device includes a transaction counter, and wherein said processor of said mobile processing device is further configured to use said transaction counter at least in part to generate said dynamic authentication code.

14. The system of claim 13 wherein said authorization database further includes a copy of said transaction counter, and wherein said authorization processor is further for verifying said transaction counter used to generate said dynamic authentication code matches said copy of said transaction counter.

15. The system of claim 13 wherein said processor is further configured to update said transaction counter when said dynamic authentication code is generated.

16. The method of claim 1, further comprising:

transmitting a challenge number or other unpredictable data to a user; and wherein said processor of said mobile processing device is further configured to generate said dynamic authentication code based at least in part on said challenge number or other unpredictable data.

* * * * *